(12) United States Patent
Gilra et al.

(10) Patent No.: US 9,830,717 B2
(45) Date of Patent: Nov. 28, 2017

(54) NON-DESTRUCTIVE AUTOMATIC FACE-AWARE VIGNETTES

(71) Applicant: Adobe Systems Incorporated, San Jose, CA (US)

(72) Inventors: Anant Gilra, Sunnyvale, CA (US); Lance R. Lewis, San Ramon, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 36 days.

(21) Appl. No.: 14/934,068

(22) Filed: Nov. 5, 2015

(65) Prior Publication Data

US 2017/0132810 A1 May 11, 2017

(51) Int. Cl.
G06T 11/00 (2006.01)
G06T 5/00 (2006.01)
G06K 9/00 (2006.01)
G06T 3/40 (2006.01)
G06F 3/14 (2006.01)
G06K 9/03 (2006.01)
G06K 9/32 (2006.01)

(52) U.S. Cl.
CPC ............ *G06T 11/001* (2013.01); *G06F 3/14* (2013.01); *G06K 9/00228* (2013.01); *G06K 9/036* (2013.01); *G06K 9/3233* (2013.01); *G06T 3/40* (2013.01)

(58) Field of Classification Search
None
See application file for complete search history.

(56) References Cited

U.S. PATENT DOCUMENTS

| 2007/0291338 | A1* | 12/2007 | Williams | H04N 1/00161 358/537 |
| 2012/0179571 | A1* | 7/2012 | Grosso, III | G06Q 30/0621 705/26.5 |
| 2013/0235071 | A1* | 9/2013 | Ubillos | G06F 3/0484 345/600 |
| 2014/0341425 | A1* | 11/2014 | Babacan | G06K 9/00228 382/103 |

* cited by examiner

*Primary Examiner* — Tize Ma
(74) *Attorney, Agent, or Firm* — Wolfe-SBMC (57) ABSTRACT

Techniques for non-destructive automatic face-aware vignettes are described. In implementations, a request is received to generate a vignette for an image that includes face(s) or other salient object(s) or a combination faces and salient objects displayed in the image. Based on the request, a boundary can be determined that encloses the face(s) or other salient object(s) or both. Using the boundary, one or more parameters of the vignette are automatically modified to customize the vignette based on the face(s) or other salient object(s) or both displayed in the image. Then, a customized version of the vignette can be generated for the image based on the modified parameters.

20 Claims, 7 Drawing Sheets

NON-DESTRUCTIVE AUTOMATIC FACE-AWARE VIGNETTES

BACKGROUND

Generally, in terms of image processing, a vignette is an artistic effect causing an image to fade into its background without a defined border. Conventional techniques for creating a vignette for an image generally produce a default vignette centered on the image, regardless of the content of the image. Users can then modify individual vignette parameters to adjust the vignette for the image. For many users, particularly non-professional users, these conventional techniques can be time consuming when attempting to create a vignette that is customized to the content of the image and which appears at least semi-professional. For example, in images that include faces, the focus of the vignette generally should be adjusted such that the faces are not obscured by the vignette and such that the image appears artistically and visually appealing. Moreover, many users may not be aware of professional photography guidelines, such as the rule of thirds, which is used to optimize the visual appeal of the image. Accordingly, these conventional techniques for creating vignettes simply rely on user input, regardless of the user's lack of knowledge and skill in photography, to customize a vignette for the image. Consequently, customizing a vignette for an image using conventional techniques can be inefficient and time consuming, which can lead to a poor user experience.

SUMMARY

This Summary introduces features and concepts of non-destructive automatic face-aware vignettes, which is further described below in the Detailed Description and/or shown in the Figures. This Summary should not be considered to describe essential features of the claimed subject matter, nor used to determine or limit the scope of the claimed subject matter.

Non-destructive automatic face-aware vignettes are described. In embodiments, a computing device is implemented for generating non-destructive automatic face-aware vignettes. The computing device can receive a request to generate a vignette for an image that includes a face, a salient object (e.g., object deemed important in an image), or both, displayed in the image. Then, the computing device can determine a boundary that encloses the face, the other salient object, or both, displayed in the image. The boundary can then be used by the computing device to automatically modify parameters of the vignette to customize the vignette based on the face or other salient object displayed in the image. In addition to determining the boundary, an aspect ratio of the image is determined and used to modify additional parameters of the vignette to further customize the vignette for the image. Subsequently, the computing device can generate a customized version of the vignette for the image based on the modified parameters. In implementations, the customized version of the vignette is generated as a greyscale mask overlay over the image. In this way, the vignette is non-destructive to the image because if the image is resized, the vignette can be recalculated based on a new aspect ratio and a relative position of the face or other salient object or both in the resized image.

The techniques described herein enable users, even novice users, to quickly and efficiently create a vignette that is customized to the content of the image and which is artistically and visually appealing based on rules of professional photography, all without requiring user input. Thus, the techniques described herein can save a user time and frustration compared to conventional techniques, and can also enable non-professional users, who lack professional knowledge or skill, to create a professional-looking visual effect for an image.

BRIEF DESCRIPTION OF THE DRAWINGS

Embodiments of non-destructive automatic face-aware vignettes are described with reference to the following Figures. Entities represented in the Figures may be indicative of one or more entities and thus reference may be made interchangeably to single or plural forms of the entities in the discussion. The same numbers may be used throughout to reference like features and components that are shown in the Figures.

DETAILED DESCRIPTION

Overview

Conventional techniques used for creating a customized vignette for an image can be inefficient and time consuming for some users, such as non-professional users, attempting to optimize the artistry and visual appeal of the vignette. For example, because these conventional techniques fail to account for the content of the image, users are required to modify individual vignette parameters to create the desired "look" for the image. However, these users may lack the knowledge and skill required to quickly and efficiently create an artistically and visually appealing vignette for the image.

As used herein, the term "vignette" may refer to an illustration or portrait photograph that fades into its background without a definite border. For example, a vignette in photography can refer to a reduction of an image's brightness or saturation at the periphery compared to the image center. In implementations, a vignette can be generated as a greyscale mask overlay over an image. Alternatively or additionally, the greyscale mask can be imposed with color to produce, for example, an orange vignette, a yellow vignette, a red vignette, and so on. Thus, the term "vignette" can refer to a variety of different types of vignettes.

Techniques implemented for non-destructive automatic face-aware vignettes are described herein in a variety of different implementations. In one example, a vignette can be generated and automatically customized for an image based on image characteristics and a boundary of a face or other salient object or both in the image. The boundary can be determined using object or face detection technology, and can be used to identify a position of a center location of the boundary to represent a location of the face or other salient object or both in the image. If, however, there are multiple faces or other salient objects in the image, a boundary enclosing all the faces or other salient objects or both can be determined and used to identify the center location of the boundary. Then, a location for the center of the vignette is determined based on an average between the boundary center location and an image center location. By using the average of centers, the rule of thirds in professional photography can be maintained, without the user's input and without cropping the image.

Because the center of the vignette is displaced from the image center location, additional parameters of the vignette can also be modified to improve the artistic and visual appeal of the vignette. For example, these additional parameters can include parameters such as eccentricity, radius, and feather. The eccentricity, for instance, can be adjusted based on image characteristics, such as an aspect ratio of the image. In addition, the radius and feather can each be adjusted based on the eccentricity and based on a distance between the boundary center location and the image center location. Using these adjusted parameters, the vignette is customized to the content of the image. In implementations, the vignette can be generated as a mask, and then overlaid over the image. If the image is subsequently resized (e.g., cropped), the vignette can be recalculated based on a new image aspect ratio and relative position of the face(s) and other salient object(s) displayed in the image. Using the techniques discussed herein, even novice users can quickly create a vignette that is automatically customized to the content of the image and which is artistically appealing based on rules of professional photography.

As used herein the term "salient object" may refer to objects that are deemed important to an image. Examples of salient objects include foreground objects, faces, objects that are the focus of an image, and so on. Thus, the term "salient object" can include a variety of objects that are deemed important to the image.

As used herein the term "eccentricity" may refer to an amount that an ellipse deviates from being circular. The eccentricity is derived from the term "orbital eccentricity," which refers to a parameter that determines an amount by which an orbit of an astronomical object around another body deviates from a perfect circle. For example, a value of zero represents a circular orbit, while values between one and zero represent an elliptical orbit. As referred to herein, a positive value represents an ellipse having a landscape orientation, while a negative value represents an ellipse having a portrait orientation.

As used herein, the term "feather" may refer to a softening of an edge of an image by making the edge gradually fade out until the edge becomes transparent. In implementations, feathering can blur the edges of an image by building a transition boundary between a selection boundary and its surrounding pixels. Consequently, the feather represents a gradient, such as fading or shading, between an inner radius and an outer radius of the vignette.

As used herein, the term "application" may refer to computer software that causes a computer to perform useful tasks. Some examples of applications can include a software application, an application program, a mobile app, a desktop application, and so on. Additional examples of applications include web browsers, email programs, word processors, games, utilities, social networking applications, instant messaging applications, and so on. In at least some embodiments, an application may represent a service that is accessible over a network, such as a cloud-based service, a distributed application, and so forth. Thus, an application is not limited to functionalities installed locally on a client device. Further examples of the above-described terms may be found in relation to the following discussion.

In the following discussion, an example environment is first described that may use the techniques described herein. Example procedures are then described which may be performed in the example environment as well as other environments. Consequently, performance of the example procedures is not limited to the example environment and the example environment is not limited to performance of the example procedures.

Example Environment

Figure 1:
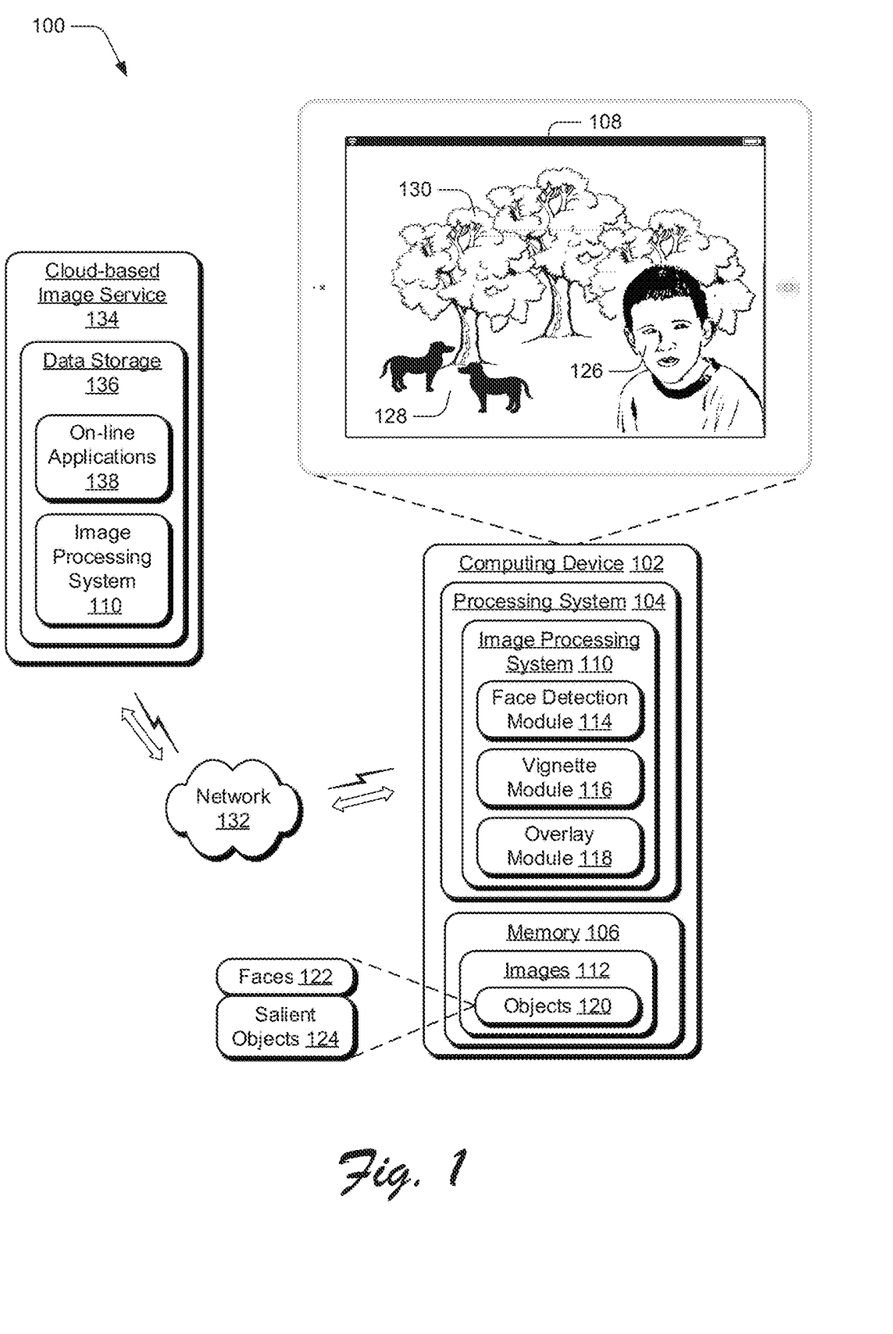
FIG. 1 is an illustration of an environment in an example implementation of a computing device that is operable to implement techniques for non-destructive automatic face-aware vignettes.

FIG. 1 is an illustration of an environment 100 in an example implementation that is operable to utilize techniques usable to generate non-destructive automatic face-aware vignettes. The illustrated environment 100 includes a computing device 102, which may be configured in a variety of ways. For example, the computing device 102 may be a desktop computer, a laptop computer, a mobile device (e.g., assuming a handheld configuration such as a tablet or mobile phone), and so forth. Additionally, although the single computing device 102 is shown, the computing device 102 may be representative of a plurality of different devices, such as multiple servers utilized by a business to perform operations "over the cloud" as further described in relation to FIG. 7.

The computing device 102 is illustrated as including a variety of hardware components, examples of which include a processing system 104, an example of a computer-readable storage medium illustrated as memory 106, a display device 108, and so on. The processing system 104 is representative of functionality to perform operations through execution of instructions stored in the memory 106. Although illustrated separately, functionality of these components may be further divided, combined (e.g., on an application specific integrated circuit), and so forth.

The computing device 102 is further illustrated as including an image processing system 110. The image processing system 110 is representative of functionality to process and transform images 112, such as to perform face detection, salient object detection, vignetting, image resizing, cropping, and so forth. The image processing system 110 is also illustrated as including a face detection module 114, a vignette module 116, and an overlay module 118.

The face detection module 114 represents functionality to detect objects 120 displayed in the image 112, such as faces 122 or other salient objects 124 or both. For example, the face detection module 114 can be implemented to detect a face 126 of a person displayed via the display device 108. Additionally or alternatively, the face detection module 114 can be implemented to detect salient objects 124 such as one or more dogs 128 displayed via the display device 108, if the dogs 128 are determined to be important in the image. In contrast, some objects such as trees 130 may be determined to be part of the background and not considered to be salient or important to the image. Alternatively, in at least some instances, the trees 130 can be considered salient if the image does not include any faces and the trees 130 are the focus of the image.

The environment 100 is also illustrated as including a network 132 via which the computing device 102 can communicate with one or more additional computing devices or servers or both. Although the network 132 is illustrated as the Internet, the network may assume a wide variety of configurations. For example, the network 132 may include a wide area network (WAN), a local area network (LAN), a wireless network, a public telephone network, an intranet, and so on. Further, although a single network 132 is shown, the network 132 may be representative of multiple networks.

The environment 100 can also include a cloud-based image service 134, such as Adobe Creative Cloud™ that is accessible by client devices, such as the computing device 102. The image service 134 includes data storage 136 that may be implemented as any suitable memory, memory device, or electronic data storage for network-based data storage. The data storage 136 can maintain an instance of the image processing system 110, as well as on-line applications 138 (e.g., as network-based applications), that are accessible by the computing device 102.

The cloud-based image service 134 can also be implemented with server devices that are representative of one or multiple hardware server devices of the image service. Further, the cloud-based image service 134 can be implemented with various components, such as a processing system and memory, as well as with any number and combination of differing components as further described with reference to the example device shown in FIG. 7 to implement the services, applications, servers, and other features of non-destructive automatic face-aware vignettes.

Example Implementation

The following discussion describes example implementations of non-destructive automatic face-aware vignettes that can be used to perform various aspects of techniques discussed herein. The example implementations may be used in the environment 100 of FIG. 1, the system 700 of FIG. 7, and/or any other suitable environment.

Figure 2:
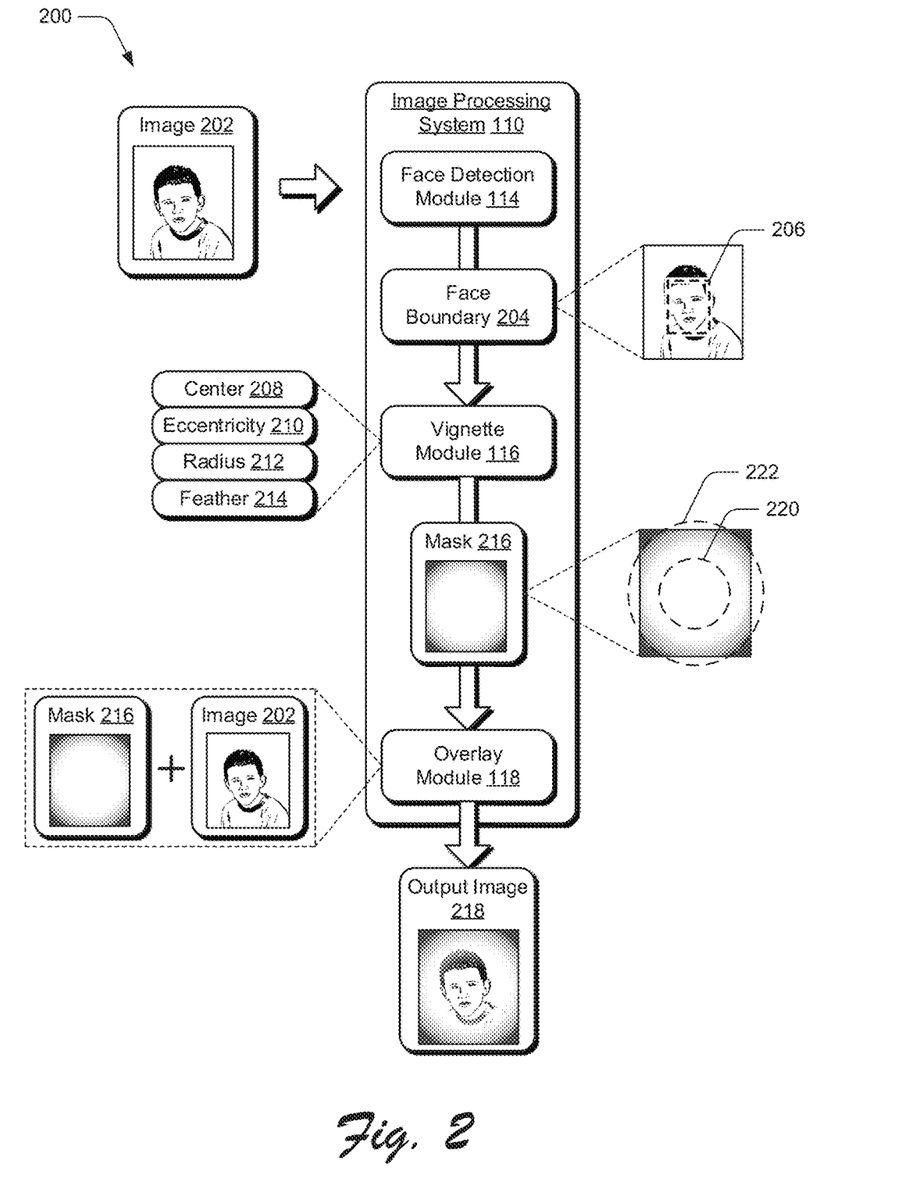
FIG. 2 illustrates an example implementation of functionalities represented by an image processing system of FIG. 1 to generate a non-destructive automatic face-aware vignette for an image.

FIG. 2 illustrates an example implementation 200 of functionalities represented by the image processing system 110 of FIG. 1 to generate a non-destructive automatic face-aware vignette for an image 202. The image 202 can include any of a variety of digital images, such as a photograph, a digital drawing, a screen capture, and so on. In the illustrated example 200, the image processing system 110 performs a series of operations on the image 202. In implementations, the image processing system 110 can utilize the face detection module 114 to identify face(s) or other salient objects or both displayed in the image 202 and determine a face boundary 204 that encloses the identified face(s) or other salient objects or both displayed in the image. While FIG. 2 describes an example that uses image 202 displaying a face, an image without any faces can also be used to generate a non-destructive automatic face-aware vignette. For example, an image without any faces can be analyzed to detect one or more salient objects to determine a boundary that encloses the one or more salient objects. For purposes of discussion, however, the illustrated example utilizes the image 202 that displays a face.

In the illustrated example, the face detection module 114 has identified a face displayed in the image 202 and a face boundary 204 that encloses the face. For example, the face boundary 204 can include a rectangular shape 206 that encloses the face in the image 202. Alternatively, the face boundary 204 can be represented by an ellipse, a circle, or any of a variety of polygons. Further still, the face boundary 204 can be represented by a boundary that substantially follows a contour of the face displayed in the image 202. In implementations where the image includes multiple faces, a separate face boundary can be calculated for each face or group of faces, or a single face boundary can be calculated that encloses all the faces displayed in the image, further discussion of which is provided below. Thus, any of a variety of shapes can be utilized to represent the face boundary 204.

The face boundary 204 is then utilized by the vignette module 116 to calculate one or more parameters of a vignette for use in generating a customized vignette for the image 202 based on the content in the image 202. Some example parameters of the vignette that can be calculated by the vignette module 116 include center 208, eccentricity 210, radius 212, and feather 214. Once these parameters are calculated, the vignette module 116 can generate a mask, such as mask 216 having the customized vignette for the image 202. The mask 216 can then be overlaid over the image 202 by the overlay module 118 to produce an output image 218 having the customized vignette over the image.

In the illustrated example, the mask 216 includes a vignette having an elliptical shape. The vignette fades the edges of the mask into the background without a defined border. In implementations, the center 208 of the vignette for an image without any faces or other salient objects is located at the image center location of the image. When the image includes at least one person's face, the center 208 of the vignette can be displaced based on a location of the face(s) displayed in the image 202. Simply matching the center 208 of the vignette to the center of the person's face may be undesirable because it might negate the rule of thirds of professional photography. The rule of thirds is a guideline indicating that an image should be imagined as divided into nine equal parts by two equally spaced horizontal lines and two equally spaced vertical lines, and that important compositional elements should be placed along these lines or their intersections. Proponents of the technique claim that aligning a subject with these points creates more tension, energy, and interest in the composition than simply centering the subject.

To apply the rule of thirds in the automatic displacement of the vignette, the center 208 of the vignette can be calculated based on an average between the image center location and the boundary center location of the face boundary, as described by the following equation:

$$C_x = K_{c1}*C1_x + K_{c2}*C2_x$$

$$C_y = K_{c1}*C1_y + K_{c2}*C2_y \qquad \text{Equation 1}$$

In Equation 1, the term $C_x$ refers to an x-coordinate of a location of the center 208 of the vignette while the term $C_y$ refers to a y-coordinate of the location of the center 208 of the vignette. In addition, the terms $K_{c1}$ and $K_{c2}$ are constants such as 0.5, for example. Also, the term C1 refers to the image center location of the image 202, while the term C2 refers to a boundary center location of the face boundary 204. Since the location of the center 208 of the vignette is displaced from the image center location, other vignette parameters may need to be modified to create an artistic and visually appealing vignette for the image 202.

The eccentricity 210 of the vignette can be determined based on an aspect ratio of the image 202. For example, an eccentricity factor can be calculated based on the aspect ratio of the image by using the following equation:

$$eccFactor = K_{e1} * \left(1 - \frac{imgRatio}{K_{e2}}\right) \quad \text{Equation 2}$$

In Equation 2, the term eccFactor represents an eccentricity factor used in calculating the eccentricity of the vignette. In addition, the terms $K_{e1}$ and $K_{e2}$ are constants, such as experimentally determined values. Also, the term imgRatio refers to the aspect ratio with a value that is greater than one. For instance, imgRatio=width/height if the width of the image is greater than the height of the image. Otherwise, imgRatio=height/width if the height of the image is greater than the width of the image. In this way, the term imgRatio is always greater than a value of one.

The eccentricity 210 of the vignette can then be determined based on the following:

eccentricity=eccFactor*imgRatio, if width>height eccentricity=−eccFactor*imgRatio, if width<height    Equation 3

In Equation 3, a positive eccentricity indicates that a long axis of the ellipse formed by the vignette is parallel to the x-axis such that the ellipse has a landscape orientation. In contrast, a negative eccentricity indicates that the vignette's long axis is parallel to the y-axis such that the ellipse has a portrait orientation.

The radius 212 can represent a radius of the ellipse formed by the vignette along a major axis of the ellipse or along a minor axis of the ellipse. Alternatively, the radius 212 can represent an average of the major axis radius and the minor axis radius. Thus, the radius 212 can represent any of a variety of radii of the ellipse that is formed by the vignette.

The feather 214 represents a gradient of the vignette, such as the illustrated fading or shading between inner radius 220 and outer radius 222. The feather 214 is defined by a distance between the inner radius 220 (e.g., starting point) and the outer radius 222 (e.g., ending point). In at least some implementations, it may be desirable to have a large feather, such as for a panoramic image that includes a large aspect ratio. However, a large feather on a relatively smaller image may obscure the content of the smaller image. Thus, a relatively smaller feather may be desirable on the smaller image.

The radius 212 and the feather 214 are both a function of excess eccentricity, which refers to an amount by which the eccentricity exceeds a desired or recommended amount of eccentricity for an image to have an artistic and professional "look." The excess eccentricity can be determined based on the following:

excessEcc=absolute(eccentricity)−$K_{ee}$    Equation 4

In Equation 4, the term $K_{ee}$ is a constant, and the excess eccentricity is provided by subtracting the constant $K_{ee}$ from the absolute value of the eccentricity. The excess eccentricity is used to adjust the radius 212 and the feather 214 from default values based on the aspect ratio of the image 202. In particular, the radius 212 can be determined based on the following, if excessEcc>0:

$$radius = K_{r1} + \left(\frac{excessEcc}{K_{r2}}\right) \quad \text{Equation 5}$$

In Equation 5, the terms $K_{r1}$ and $K_{r2}$ are constants. If excessEcc is not greater than zero, however, then radius=$K_{r1}$. The feather 214 is calculated similarly, based on the following, if excessEcc>0:

$$feather = K_{f1} + \left(\frac{excessEcc}{K_{f2}}\right) \quad \text{Equation 6}$$

In Equation 6, the terms $K_{f1}$ and $K_{f2}$ are constants. If excessEcc is not greater than zero, however, then feather=$K_{f1}$.

In implementations, when the center 208 of the vignette is displaced from the image center location, then the radius 212 and the feather 214 can also be further adjusted. For instance, assume that the center 208 of the vignette is displaced toward the right side of the image, and the feather is relatively small, then the resulting vignette will darken very quickly on the opposing side (e.g., left side) of the image and possibly leave much of the left side of the image very dark. To avoid this, the radius 212 and the feather 214 are increased when the center 208 is displaced.

For instance, a center displacement ratio CDR is calculated for adjusting the radius 212 and the feather 214, based on the following:

CDR=max(abs($C1_x$−$C2_x$),abs($C1_y$−$C2_y$))    Equation 7

In Equation 7, the center displacement ratio CDR is represented by a maximum displacement in each axis (e.g., x-axis and y-axis) between the image center location C1 and the boundary center location C2. The radius 212 can then be adjusted based on the following equation:

R=radius+CDR*$K_{r3}$    Equation 8

In Equation 8, the term R refers to an adjusted vignette radius that is adjusted based on the center displacement, and the term $K_{r3}$ is a constant. In addition, the feather 214 can be similarly adjusted, using a constant $K_{r3}$, and the following equation:

F=feather+CDR*$K_{f3}$    Equation 9

In the illustrated example, the various vignette parameters are utilized to generate the mask 216. The overlay module 118 can then overlay the mask 216 onto the image 202 to produce an output image 222, which includes a customized vignette based on the content of the image 202. In the illustrated example, the output image 222 includes a customized vignette that is automatically customized based on the location of the face in the image 202. Consider now some examples of automatically customized vignettes in FIGS. 3-6.

Figure 3:
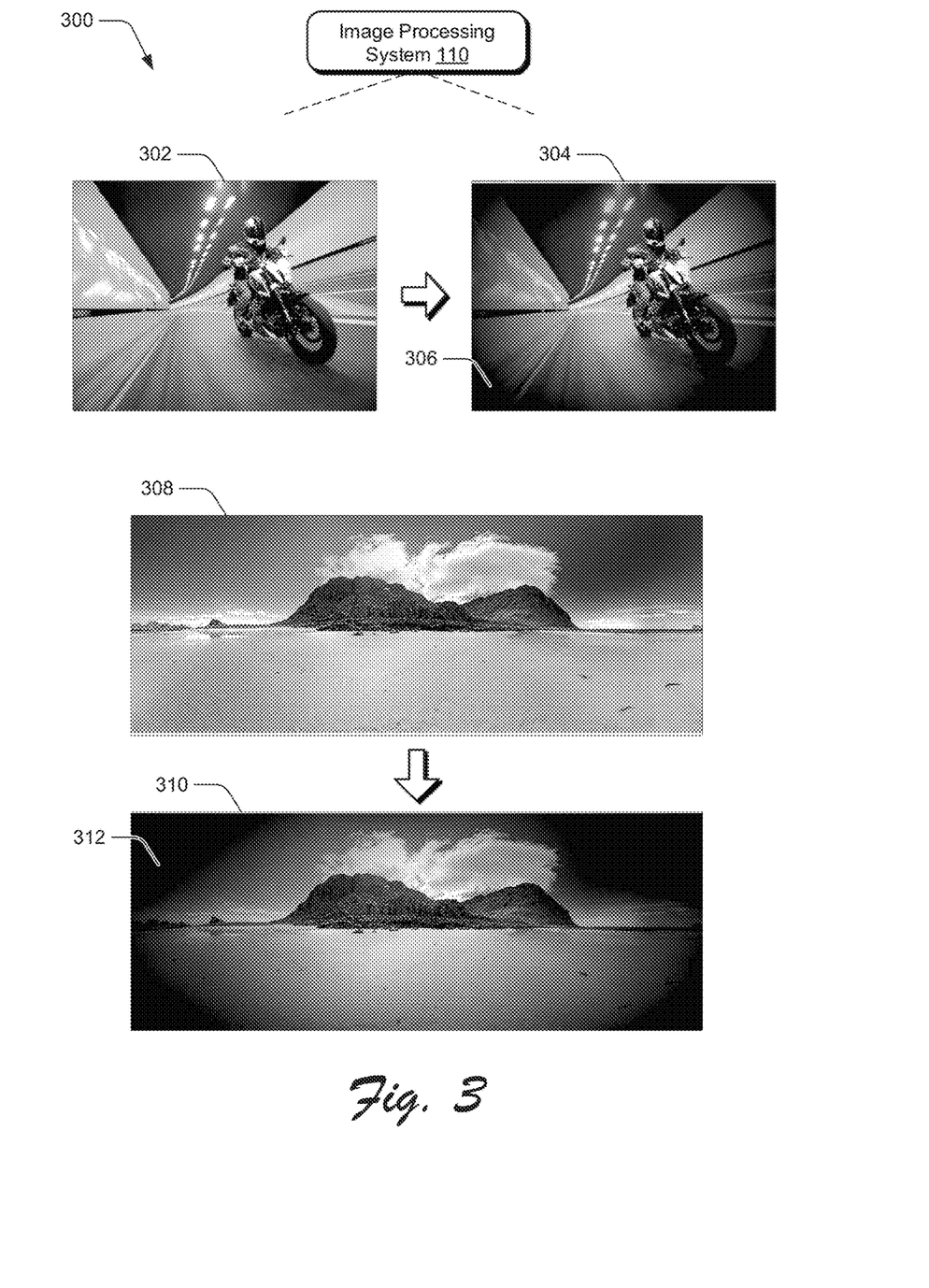
FIG. 3 illustrates example embodiments in which non-destructive automatic face-aware vignettes are implemented.

FIG. 3 illustrates example embodiments 300 in which non-destructive automatic face-aware vignettes are implemented. For example, image 302 includes a photograph of a person riding a motorcycle. Applying a non-destructive automatic face-aware vignette can output image 304, which includes an elliptical vignette 306 that fades the edges into the background and which is customized based on the image 302 having a landscape orientation. The techniques described herein can also be applied to panoramic images such as image 308, which is a panoramic view of mountains. An automatic face-aware vignette applied to the image 308 can produce image 310, which uses the mountains as the subject of the image since there are no faces displayed in the image. Notice that vignette 312 has a larger feather (e.g., shading) in comparison to the relatively smaller feather of the vignette 306 of image 304. This difference in feather is based on the different aspect ratios of the images 304 and 310. Accordingly, the vignette is generated to fit any of a variety of aspect ratios of the image.

Figure 4:
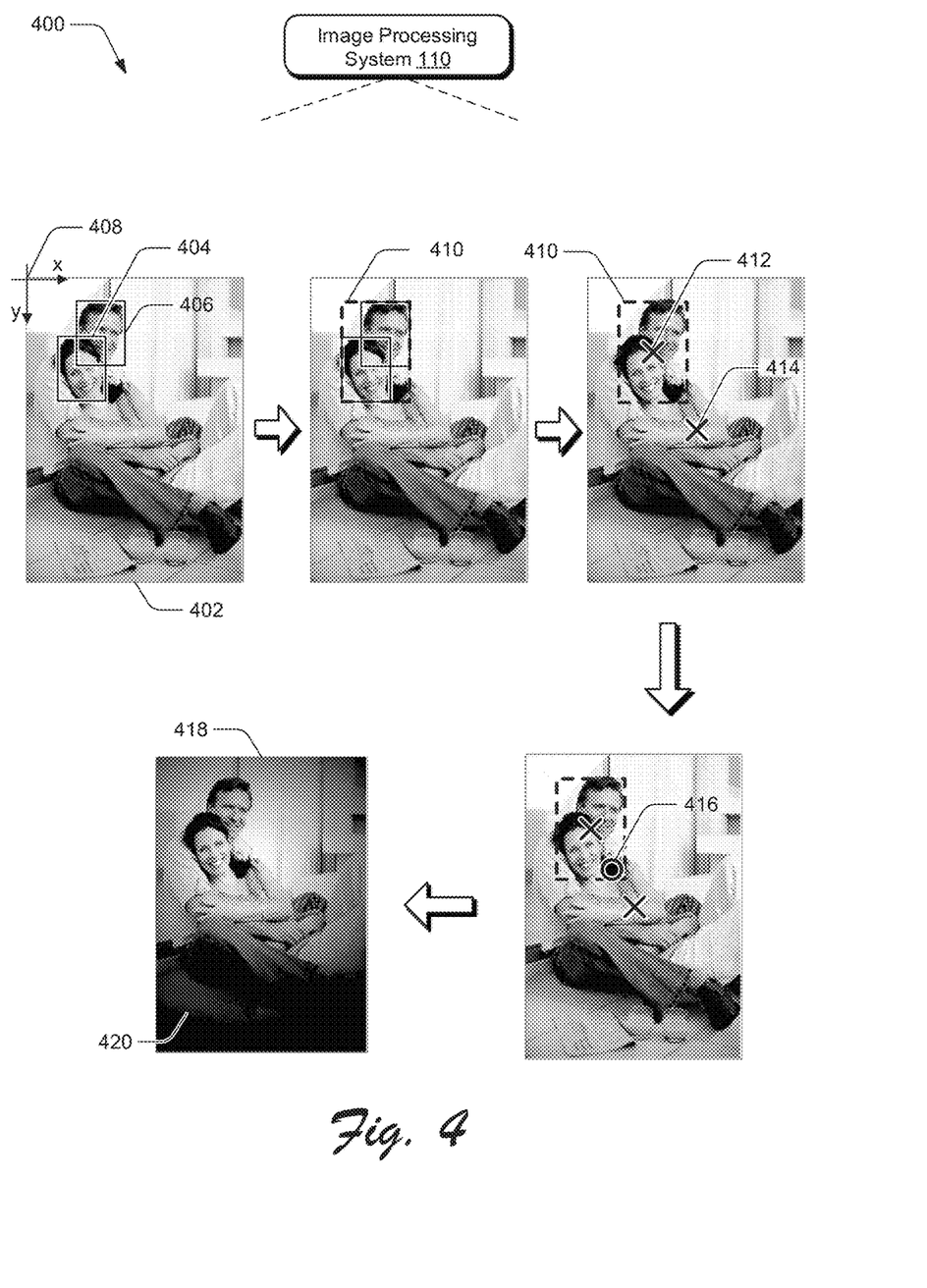
FIG. 4 illustrates example techniques for implementing non-destructive automatic face-aware vignettes in accordance with one or more embodiments as described herein.

FIG. 4 illustrates example techniques for implementing non-destructive automatic face-aware vignettes for an image displaying multiple faces in accordance with one or more embodiments as described herein. In the illustrated example 400, image 402 includes two faces that can be detected using the face detection module 114. Once the faces are detected, each face can be enclosed by face boundary, such as boundaries 404 and 406. Any of a variety coordinate systems can be used to determine locations of features in the image. Here, a Cartesian coordinate system is used with an origin 408 that is located, for example, at a top left corner of the image 402. Although the origin 408 is illustrated as being located at the top left corner of the image 402, any location can be used for the origin 402.

In implementations, a new face boundary 410 is determined that encloses all the faces displayed in the image 402. The new face boundary 410 can be determined, for example, based on at least two points, such as a top left corner and a bottom right corner to form a rectangular new boundary that encloses all the faces displayed in the image 402. The top left corner is based on a minimum x-coordinate $x_1$ and a minimum y-coordinate $y_1$, while the bottom right corner is based on a maximum x-coordinate $x_2$ and a maximum y-coordinate $y_2$. Although a rectangular boundary is shown in FIG. 4, any of a variety of shapes can be used to enclose the faces displayed in the image, examples of which are described above.

Once the new face boundary 410 is determined, a center location 412 of the new face boundary 410 is identified. In addition, an image center location 414 of the image 402 is identified. Then, the boundary center location 412 is used in combination with the image center location 414 to determine an average center 416 that can be used as the vignette center location. This is illustrated by image 418, which includes a vignette 420 displaced from the image center location 414 based on the average center 416. Notice that the shading of the vignette 420 is more prominent near the bottom of the image 418 than on the top. This is due to the displacement of the vignette 420 from the image center location 414. Notice, however, that the vignette's center location 416 is not centered on the couple's faces, but is located between the center of the couple's faces (e.g., boundary center location 412) and the image center location 414.

In at least some embodiments, the average center location 414 can be a weighted average. For example, more or less weight can be given to the boundary center location 412 of the new face boundary 410 based on one or more attributes of the faces detected in the image to increase or decrease the displacement of the vignette. Alternatively, rather than a single new face boundary that encloses all the faces displayed in the image, each of the face boundaries can be used in combination to determine the average center. For instance, center locations for each of the face boundaries 404 and 406 can be used in combination with the image center location 416 to determine an average location between all of the center locations. Further, each of the center locations of the face boundaries can be weighted, such that the average center is a weighted average.

Example Procedures

The following discussion describes techniques for non-destructive automatic face-aware vignettes that may be implemented utilizing the previously described systems and devices. Generally, any of the components, modules, methods, and operations described herein can be implemented using hardware (e.g., fixed logic circuitry), firmware, software, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
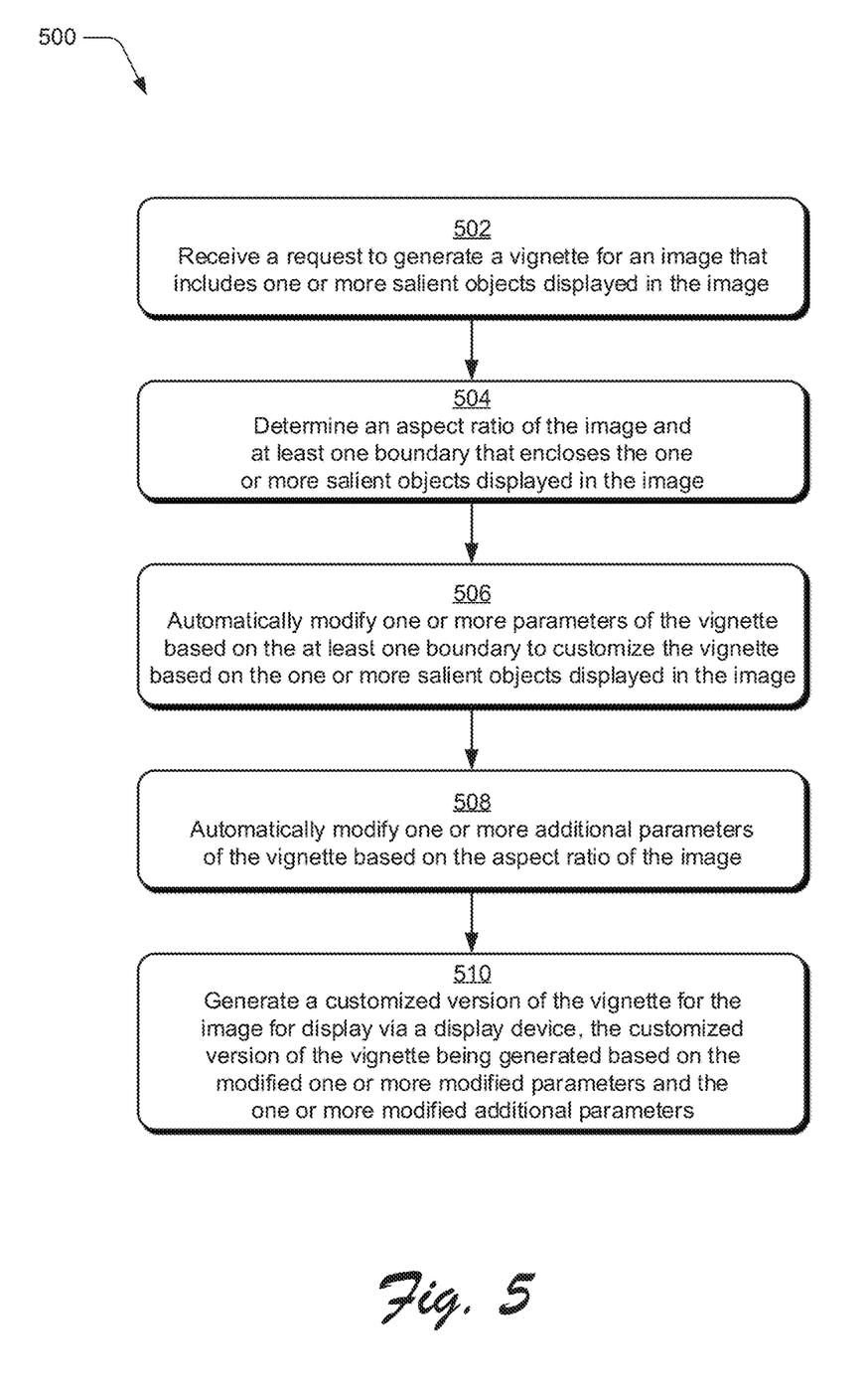
FIG. 5 illustrates example methods for implementing techniques for non-destructive automatic face-aware vignettes in accordance with one or more embodiments described herein.

FIG. 5 illustrates example techniques 500 for implementing non-destructive automatic face-aware vignettes in accordance with one or more embodiments as described herein. The order in which the method is described is not intended to be construed as a limitation, and any number or combination of the method operations can be combined in any order to implement a method, or an alternate method At 502, a request is received to generate a vignette for an image that includes one or more salient objects displayed in the image. For example, the computing device 102 (shown in FIG. 1) can receive a request, such as a user input, to generate the vignette for the image. Alternatively, the request can be received at the cloud-based image service 134 (show in FIG. 1) from the computing device 102 via network 132, such as via an on-line application.

At 504, an aspect ratio of the image is determined and at least one boundary is determined that encloses the one or more salient objects displayed in the image. For example, the aspect ratio can be determined based on any of a variety of different techniques, such as by accessing metadata associated with the image that identifies the aspect ratio of the image, calculating the aspect ratio by identifying width and height measurements based on pixel number, and so on. In addition, the face detection module 114 (shown in FIGS. 1 and 2) can detect the one or more salient objects displayed in the image and determine a single boundary enclosing all the salient objects or multiple boundaries that each enclose one or more salient objects displayed in the image, such as a single object or a group of objects.

At 506, one or more parameters of the vignette are automatically modified based on the at least one boundary to customize the vignette based on the one or more salient objects displayed in the image. For example, the vignette module 116 (shown in FIGS. 1 and 2) automatically modifies vignette parameters such as center, eccentricity, radius, and feather based on the aspect ratio of the image and a center location of the at least one boundary relative to the image center location. Examples of these automatic modifications are described above.

At 508, one or more additional parameters of the vignette are automatically modified based on the aspect ratio of the image. For instance, parameters such as eccentricity, feather, and radius can be adjusted based on the image width and height, as discussed above. In this way, the vignette size, shape, and appearance are adjusted to fit the size and shape of the image.

At 510, a customized version of the vignette is generated for the image based on the one or more modified parameters and the one or more modified additional parameters. For example, the customized vignette can be generated as a greyscale mask that can be overlaid over the image. By creating the vignette as a mask overlay, the vignette is non-destructive to the image, and the image can be resized without affecting the vignette. For example, the image can be cropped to a new size, and the vignette can responsively be recalculated for the new size.

Figure 6:
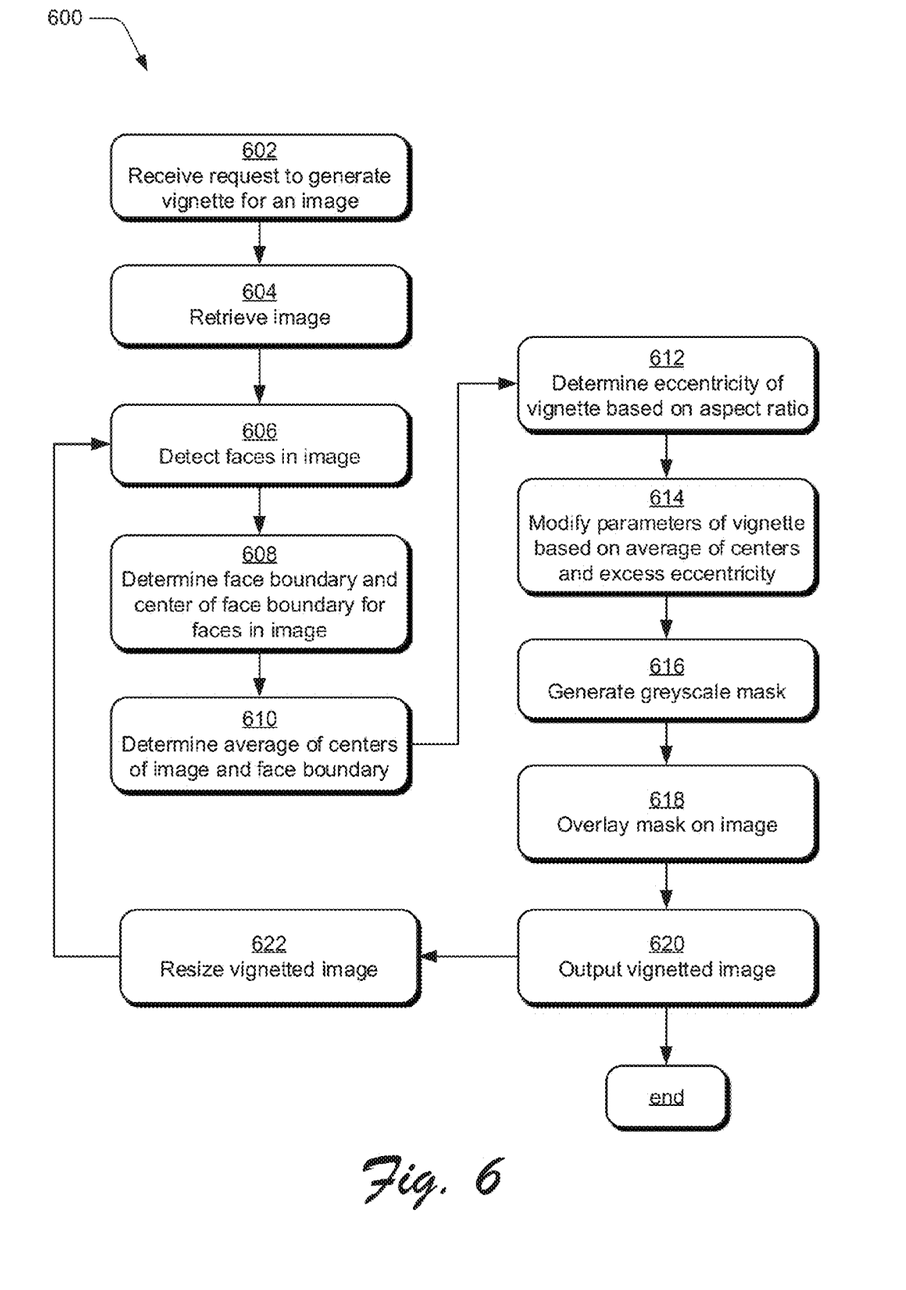
FIG. 6 illustrates example methods for implementing techniques for non-destructive automatic face-aware vignettes in accordance with one or more embodiments described herein.

FIG. 6 illustrates example methods for implementing techniques for non-destructive automatic face-aware vignettes in accordance with one or more embodiments described herein. At 602, a request is received to generate a vignette for an image. At 604, the image processing system 110 retrieves the image, such as from the memory 106 of the computing device 102 or the data storage 136 of the cloud-based service 134. At 606, one or more faces are detected in the image. For example, the face detection module 114 detects whether any person's face is displayed in the image. At 608, a face boundary and a center of the face boundary are determined for the faces in the image. For instance, the face detection module 114 determines a boundary that encloses the faces the image, and also determines a center location for the boundary.

At 610, an average of centers of the image and the face boundary is determined. For example, the average represents an average location between the image center location of the image and a boundary center location of the face boundary. As described above, the average can be a weighted average based on relative weights assigned to the boundary center location and the image center location. At 612, the eccentricity of the vignette is determined based on an aspect ratio of the image. In implementations, the eccentricity is used to determine excess eccentricity for adjusting the parameters of the vignette. At 614, the parameters of the vignette are modified based on aspect ratio of the image or the average of centers, or both. For example, the feather and radius of the vignette can be increased or decreased based on the excess eccentricity, which is based on the aspect ratio of the image. In addition, the center of the vignette can be displaced from the image center location based on the average of centers. In at least some implementations, the radius and feather can be further modified based on the displacement of the vignette.

At 616, a greyscale mask is generated. In at least some implementations, the greyscale mask can be infused with color, such as yellow, red, orange, and so on, to generate a colored vignette. By using a greyscale mask, however, the image color can be at least partially preserved. At 618, the mask is overlaid over the image. For example, the overlay module 118 can overlay the mask on the image to provide a vignetted image for display via the display device 108, and then the method can end. If, however, the vignetted image is resized, such as by being cropped or otherwise having one or both of the height and width of the image adjusted, the method responsively and automatically returns to 606 to recalculate the vignette for the resized image based on a new aspect ratio of the resized image and a relative position of the faces displayed in the resized image.

Example System and Device

Figure 7:
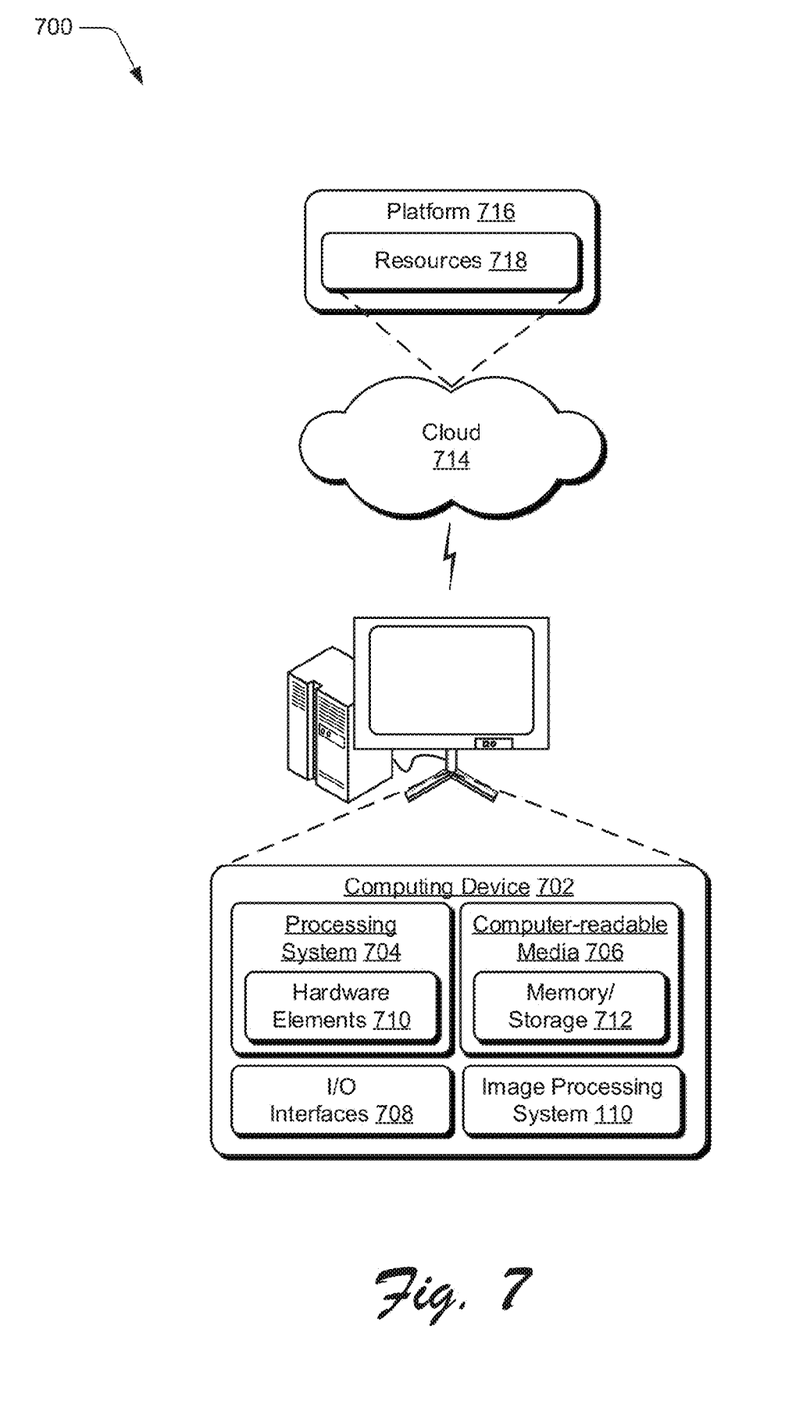
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of image processing system 110, which may be configured to generate a non-destructive automatic face-aware vignette for an image. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 or processing systems 704 or any combination thereof) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

Cloud 714 includes and/or is representative of a platform 716 for resources 718. Platform 716 abstracts underlying functionality of hardware (e.g., servers) and software resources of the cloud 714. Resources 718 may include applications or data or both that can be utilized while computer processing is executed on servers that are remote from the computing device 702. Resources 718 can also include services 720 provided over the Internet and/or through a subscriber network, such as a cellular or Wi-Fi network.

Platform 716 may abstract resources and functions to connect computing device 702 with other computing devices. Platform 716 may also serve to abstract scaling of resources to provide a corresponding level of scale to encountered demand for resources 718 that are implemented via platform 716. Accordingly, in an interconnected device embodiment, implementation of functionality described herein may be distributed throughout system 700. For example, the functionality may be implemented in part on computing device 702 as well as via platform 716 that abstracts the functionality of cloud 714.

CONCLUSION

Although the invention has been described in language specific to structural features and/or methodological acts, it is to be understood that the invention defined in the appended claims is not necessarily limited to the specific features or acts described, and other equivalent features and methods are intended to be within the scope of the appended claims. Rather, the specific features and acts are disclosed as example forms of implementing the claimed invention. Further, various different embodiments are described and it is to be appreciated that each described embodiment can be implemented independently or in connection with one or more other described embodiments.

What is claimed is:

1. A computer-implemented method for generating non-destructive automatic face-aware vignettes, the method comprising:
    receiving a request to generate a vignette for an image that includes one or more salient objects displayed in the image;
    determining an aspect ratio of the image and at least one boundary that encloses the one or more salient objects displayed in the image;
    automatically modifying one or more parameters of the vignette based on the at least one boundary to customize the vignette based on the one or more salient objects displayed in the image;
    determining an eccentricity of the vignette based on the aspect ratio, the eccentricity representing an amount that the vignette deviates from being circular;

determining an excess eccentricity representing an additional amount by which the eccentricity exceeds a recommended amount of eccentricity associated with the aspect ratio;

automatically modifying one or more additional parameters of the vignette based on the excess eccentricity; and generating a customized version of the vignette for the image for display via a display device, the customized version of the vignette being generated based on the one or more modified parameters and the one or more additional modified parameters.

2. A computer-implemented method as recited in claim 1, further comprising creating a greyscale mask overlay over the image, the greyscale mask overlay including the customized version of the vignette.

3. A computer-implemented method as recited in claim 1, wherein the customized version of the vignette is configured to avoid obscuring the one or more salient objects displayed in the image.

4. A computer-implemented method as recited in claim 1, wherein automatically modifying the one or more parameters of the vignette includes displacing the vignette based on an average between an image center location of the image and a boundary center location of the at least one boundary that encloses the one or more salient objects displayed in the image.

5. A computer-implemented method as recited in claim 4, wherein the one or more additional parameters include at least one of radius, and feather of the vignette.

6. A computer-implemented method as recited in claim 1, wherein:

the at least one boundary includes multiple boundaries that each enclose a different salient object displayed in the image; and automatically modifying the one or more parameters of the vignette includes displacing the vignette based on an average location between an image center location of the image and respective boundary center locations of the multiple boundaries.

7. A computer-implemented method as recited in claim 6, wherein the average includes a weighted average based on respective weights associated with the multiple boundaries.

8. A computer-implemented method as recited in claim 1, wherein automatically modifying the one or more additional parameters of the vignette includes modifying at least one of a feather and a radius of the vignette based on the excess eccentricity.

9. A computer-implemented method as recited in claim 1, further comprising automatically recalculating the customized version of the vignette for the image responsive to the image being resized, the customized version of the vignette recalculated based on a new aspect ratio of the resized image and a relative position of the one or more salient objects displayed in the resized image.

10. A computer-implemented method as recited in claim 9, wherein the image is resized by cropping the image.

11. A computer-implemented method as recited in claim 9, wherein the image is resized by adjusting one or more of a height and a width of the image.

12. In a digital medium environment having one or more computing devices to generate non-destructive automatic face-aware vignettes, a method comprising:

detecting one or more faces displayed in an image based on a request to create a vignette for the image;

determining an aspect ratio of the image and at least one boundary that encloses the one or more faces displayed in the image;

determining excess eccentricity of the vignette based on the aspect ratio, the excess eccentricity representing an amount in excess of a recommended amount that the vignette deviates from being circular, the recommended amount associated with the aspect ratio;

customizing the vignette by at least automatically configuring one or more parameters of the vignette based on the excess eccentricity and configuring one or more additional parameters based on an average between an image center location of the image and a boundary center location of the at least one boundary; and generating a greyscale mask overlay that includes the customized vignette to overlay over the image.

13. A method as recited in claim 12, wherein the customized vignette is configured to avoid obscuring the one or more faces displayed in the image.

14. A method as recited in claim 12, wherein:

the at least one boundary includes multiple boundaries that each enclose a different face displayed in the image; and the customized vignette is displaced from the image center location based on an average location between the image center location of the image and respective boundary center locations of the multiple boundaries.

15. A method as recited in claim 14, wherein the one or more parameters of the vignette that are automatically configured include at least one of a feather and a radius of the vignette, the at least one of the feather and the radius being configured based on the excess eccentricity.

16. A method as recited in claim 12, further comprising modifying one or more of the eccentricity, radius, and feather of the vignette based on the aspect ratio of the image prior to configuring the one or more additional parameters.

17. In a digital medium environment having one or more computing devices to generate non-destructive automatic face-aware vignettes, an image processing system comprising:

a face detection module implemented at least partially in hardware of the one or more computing devices to detect one or more salient objects displayed in an image that includes one or more salient objects displayed in the image;

a vignette module implemented at least partially in hardware of the one or more computing devices to:

automatically modify one or more parameters of the vignette based on at least one boundary that encloses the one or more salient objects displayed in the image;

automatically modify one or more additional parameters of the vignette based on an excess eccentricity of the vignette, the excess eccentricity defining an amount of eccentricity in excess of a recommended amount that the vignette deviates from being circular, the eccentricity being based on an aspect ratio of the image; and create a customized vignette as a mask overlay based on the one or more modified parameters and the one or more modified additional parameters; and an overlay module implemented at least partially in hardware of the one or more computing devices to overlay the customized vignette over the image for display via a display device.

18. The image processing system as recited in claim 17, wherein the vignette module is configured to automatically modify the one or more parameters of the vignette by displacing the vignette based on an average between an image center location of the image and a boundary center location of the at least one boundary that encloses the one or more salient objects displayed in the image.

19. The image processing system as recited in claim 17, wherein the vignette module is configured to automatically modify the one or more additional parameters of the vignette by modifying one or more of a feather and a radius of the vignette based on the excess eccentricity.

20. The image processing system as recited in claim 17, wherein the customized vignette is configured to avoid obscuring the one or more salient objects displayed in the image.

* * * * *